Patented Oct. 25, 1949

2,485,744

UNITED STATES PATENT OFFICE 2,485,744

TREATMENT OF TALL OIL AND PORTIONS THEREOF

Samuel Koonce and Edmond S. Perry, Rochester, N. Y., assignors to Distillation Products, Inc., Rochester, N. Y., a corporation of Delaware No Drawing. Application September 20, 1946, Serial No. 698,398

3 Claims. (Cl. 260—97.6)

This invention relates to improved procedure for the separation of the acids contained in tall oil into rosin type and fatty acid type acids.

It is known that tall oil is composed primarily of acids which include large amounts of fatty acids and rosin acids. The mixture of acids as it occurs in tall oil is not as useful as these two types of acids when they have been segregated and, for this reason, a vast amount of research work has been done on different methods for segregating the different types of acid from tall oil. Some of these methods have been effective but have been too expensive to be commercially feasible when applied to a low cost material, such as tall oil. Many of the methods have not achieved a satisfactory segregation.

This invention has for its object to provide improved procedure for separating the acid constituents of tall oil and portions thereof. Another object is to provide an improved, relatively economical method for separating the valuable drying type fatty acids from the rosin acids contained in tall oil and its fractions. Other objects will appear hereinafter.

These and other objects are accomplished by our invention which includes subjecting tall oil or a portion thereof to esterification whereby the fatty acid components are preferentially esterified, contacting a solution of the esterified mixture with an adsorbent, whereby the unesterified rosin type acids are preferentially or more tenaciously adsorbed.

In the following examples and description I have set forth several of the preferred embodiments of my invention but it is to be understood these are given by way of illustration and not in limitation thereof.

Our invention may be applied to crude tall oil, in which case the tall oil may be treated to preferentially esterify the fatty acids contained therein. This can be accomplished by using any conventional esterification treatment but the preferred method is to heat the tall oil with an alcohol such as methyl alcohol in the presence of a catalyst such as sulphuric acid. The fatty acid esterifies more easily than the rosin acids so that there is no difficulty in obtaining a preferential esterification. This can be assured by using approximately the stoichiometric amounts of alcohol, based on the amount of fatty acid contained in the tall oil. Other esterification methods, such as the formation of acid halides may be used. Also, catalysts other than sulphuric acid, such as hydrochloric acid and alcohols other than methyl alcohol, such as ethyl, propyl, butyl, may be employed. We have found it to be advantageous to subject the raw tall oil to a preliminary high vacuum unobstructed path distillation, prior to esterification, to effect a partial segregation of the acid types and to remove constituents which would interfere with subsequent processing. This not only results in a saving in the amount of esterification reagent necessary but also materially simplifies and improves the entire procedure. Temperatures of about 80 to 250° C., with pressures customarily used for high vacuum unobstructed path conditions, may be employed. There is a real advantage, in many cases, in subjecting the esterified raw tall oil to high vacuum unobstructed path distillation prior to the chromatographic adsorption treatment and such procedure is included within the scope of our invention.

The esterified mixture from any one of the foregoing procedures is then dissolved in a solvent and contacted with an adsorbent in order to adsorb the unesterified rosin acids. Examples of suitable adsorbents are natural and artificial zeolites, such as sodium aluminum silicate, synthetic sodium aluminum silicate, fuller's earth, aluminum oxide and activated carbon. Suitable solvents are petroleum ether, hexane, gasoline, benzene, carbon tetrachloride, ethylene dichloride, acetone, methyl alcohol, ethyl alcohol and ethyl ether. These solvents are listed according to their eluting power, the solvents having lowest eluting power being listed first. The esterified tall oil is dissolved in the selected solvent and the solution is then contacted with the adsorbent. This results in adsorption of the rosin acids while the esterified fatty acids remain unadsorbed or are weakly adsorbed. The fatty acid esters drain from the adsorbent and may be entirely removed by washing with the same solvent or with one having relatively weak eluting properties. The rosin acids are then removed from the adsorbent by eluting with a solvent having more powerful eluting action. Petroleum solvents, such as petroleum ether, are preferred, since they enable the preliminary elimination of some of the rosin acids and other impurities which are insoluble therein. Contact between adsorbent and the solution can be brought about in any desired manner. Thus a column of adsorbent may be used and the solution passed through it. Preferably air is first removed from the adsorbent by a preliminary washing with solvent. Another satisfactory method is to add the adsorbent in powder or granular form to the solution of esterified tall oil. After stirring and settling, the adsorbent is separated as by filtering and the adsorbed rosin acids are recovered therefrom. The adsorbent may be reused in the process after separation of the adsorbed rosin acids.

Example 1

One hundred fifty grams of tall oil were refluxed for one hour with 100 grams of methyl alcohol and 5 grams of concentrated sulfuric acid. The reaction mixture was then permitted to cool to room temperature whereupon it was diluted with 200 cc. of distilled water and transferred to a 1000 cc. separatory funnel. The mixture was then extracted with ethyl ether using successive portions of 100, 30 and 20 cc. The combined ether extracts were washed four times with 20 cc. portions of weak brine and once with a 20 cc. portion of distilled water. The ether was removed from the selectively esterified tall oil by distillation at 15 mm.

Thirty grams of this selectively esterified tall oil were dissolved in 200 cc. of petroleum ether and passed through an adsorption column containing 500 grams of fuller's earth in a body 33 x 6 cm., supported on a glass wool plug. The column was then washed using 2,000 cc. of petroleum ether. The filtrates were combined and they contained the fatty acid esters. The adsorbent was then eluted with 2,000 cc. of acetone. This adsorbate was collected and it contained the rosin acids. The compositions of the fractions were as follows:

| Example | Composition of fractions | | | Recovery of original charge | | Recovery of rosin acids, percent of original | Recovery of fatty acids, percent of original |
|---|---|---|---|---|---|---|---|
| | Mol percent Rosin Acids | Mol percent Fatty Acids | Percent Non-Sap. | Weight, g. | Percent of original | | |
| No. 1: | | | | | | | |
| Original | 38.7 | 61.3 | 9 | 30.0 | | | |
| Filtrate | 0.8 | 99.2 | 9 | 16.5 | 55.0 | 0.1 | 93.7 |
| Adsorbate | 90.5 | 9.5 | 9 | 13.0 | 43.3 | 97.4 | 4.7 |
| Total | | | | | 98.3 | 97.5 | 98.4 |

Example 2

One hundred eighty-four grams of a tall oil fraction obtained by high vacuum unobstructed path distillation (eighty percent cut at a temperature of 100°–180° C. and pressure of 4–8 microns) were refluxed with 150 grams of methyl alcohol and 5 grams of concentrated sulfuric acid. The reaction mixture was permitted to cool to room temperature whereupon it was diluted with 250 cc. of distilled water and transferred to a 1000 cc. separatory funnel. The mixture was then extracted with ethyl ether using successive portions of 200, 30, and 20 cc. The combined ether extracts were washed four times with 20 cc. portions of weak brine, and once with a 20 cc. portion of distilled water. The ether solution was dried for 16 hours over anhydrous sodium sulfate. The ether was removed from the esterified tall oil by distillation at 15 mm.

Thirty-two and four tenths grams of this esterified tall oil were dissolved in 200 cc. of petroleum ether and passed through an adsorption column containing 500 grams of fuller's earth in a body 33 x 6 cm., supported on a glass wool plug. The column was then washed using 2,000 cc. of petroleum ether. The filtrates were combined and they contained the fatty acid esters. The adsorbent was then eluted with 2,000 cc. of acetone. This adsorbate was collected and it contained the rosin acids. The compositions of the fractions were as shown in the table below:

| Example | Composition of fractions | | | Recovery of original charge | | Recovery of rosin acids, percent of Original | Recovery of fatty acids, percent of Original |
|---|---|---|---|---|---|---|---|
| | Mol percent Rosin Acids | Mol percent Fatty Acids | Percent Non-Sap. | Weight, g. | Percent of Original | | |
| No. 2: | | | | | | | |
| Original | 43.5 | 56.5 | 4 | 32.4 | | | |
| Filtrate | 0.7 | 99.3 | 2 | 16.1 | 49.7 | 0.1 | 88.2 |
| Adsorbate | 91.9 | 8.1 | 3 | 16.7 | 51.5 | 103.0 | 6.8 |
| Total | | | | | 101.2 | 103.1 | 95.0 |

The fatty acid esters were clear, slightly yellow, oily liquids which are suitable either by themselves or converted to free acids as high quality products for use in the manufacture of synthetic resins, soaps, driers, metal polishes, insecticides, paper, textile finishing compounds, lubricants, pharmaceuticals, cosmetics, carbon paper, typewriter ribbons, rubber softeners, wetting agents, flooring compounds, cutting oils, drying and lithograph oils, plasticizers, and solvent resistant coatings.

The adsorbates were amber solids which are suitable for use in the manufacture of metal resinates, varnishes, paper sizing, soap, ester gum and plasticizers.

In order to simplify the wording of the claims the term "tall oil" has been used therein but it is to be understood that "tall oil" includes the raw oil, as well as portions such as distillates thereof.

What we claim is:

1. The process which comprises in combination esterifying the fatty acids of tall oil with a monohydroxy aliphatic alcohol without substantially esterifying the rosin acids of said oil, dissolving the mixture of esterified fatty acids and unesterified rosin acids in a solvent therefor, removing rosin acids by contacting said mixture with an adsorbent effective to adsorb substantially all of the unesterified rosin acids from said mixture without substantially adsorbing esterified fatty acids therefrom, and thereafter washing said adsorbent with a strong eluting solvent effective to remove adsorbed rosin acids therefrom.

2. The process which comprises treating tall oil with methyl alcohol in the presence of an esterification catalyst, dissolving the esterified mixture in a solvent therefor, contacting the solution with an adsorbent, washing the adsorbent with a weak eluting solvent to remove methyl esters of fatty acids and washing the adsorbent with a stronger eluting solvent to remove rosin acids.

3. The process which comprises in combination esterifying the fatty acids of tall oil with a monohydroxy aliphatic alcohol without substantially esterifying the rosin acids of said oil, dissolving the mixture of esterified fatty acids and unesterified rosin acids in a solvent therefor, and removing rosin acids by contacting said mixture with an adsorbent having the property of substantially adsorbing unesterified rosin acids from said mixture without substantially adsorbing esterified fatty acids therefrom.

SAMUEL KOONCE.
EDMOND S. PERRY.

REFERENCES CITED

The following references are of record in the file of this patent:

UNITED STATES PATENTS

| Number | Name | Date |
| --- | --- | --- |
| 2,280,843 | Oliver | Apr. 28, 1942 |
| 2,305,498 | Segesseman | Dec. 15, 1942 |
| 2,432,332 | Palmer | Dec. 9, 1947 |